United States Patent [19]

Brown et al.

[11] Patent Number: 5,249,464
[45] Date of Patent: Oct. 5, 1993

[54] SIGHT FLOW APPARATUS WITH CARTRIDGE

[75] Inventors: David E. Brown, Brunswick; David E. Purcel, Elyria, both of Ohio

[73] Assignee: Clark-Reliance Corporation, Strongsville, Ohio

[21] Appl. No.: 747,263

[22] Filed: Aug. 19, 1991

[51] Int. Cl.$^5$ .............................................. G01F 23/02
[52] U.S. Cl. ...................................... 73/323; 73/330; 116/276
[58] Field of Search ................. 73/323, 330, 331, 334; 116/276; 137/559

[56] References Cited

U.S. PATENT DOCUMENTS

| | | | |
|---|---|---|---|
| 1,124,575 | 1/1915 | Zimmer | 137/559 |
| 2,525,914 | 10/1950 | Knauth | 73/861.77 |
| 3,185,128 | 5/1965 | Moore et al. | 116/276 |

FOREIGN PATENT DOCUMENTS

| | | | |
|---|---|---|---|
| 1202018 | 9/1965 | Fed. Rep. of Germany | 116/276 |
| 952774 | 11/1949 | France | 137/559 |
| 38-16683 | 9/1963 | Japan | 137/559 |
| 797238 | 6/1958 | United Kingdom | 116/276 |

OTHER PUBLICATIONS

Tuchenhagen Factory of Engineers Sales Literature Author: Tuchenhagen North America, Inc.
Sight Flow Indicators—Jacoby-Tarbox Author: Clark-Reliance Corporation pp. 6, 7, 8, 14, 17, 18, 19 (attached).
Penberthy Sight Flow Indicators Sales Literature; Issued May/1987 Author: Penberthy pp. Pages: Title Page, pp. 2, 3, 4.

Primary Examiner—William A. Cuchlinski, Jr.
Assistant Examiner—W. Morris Worth
Attorney, Agent, or Firm—Calfee, Halter & Griswold

[57] ABSTRACT

A sight flow product includes a body having a fluid inlet and a fluid outlet. The fluid inlet and fluid outlet are designed to be connected in-line to fluid pipes within a manufacturing plant or other facility. A cartridge can be located within and conform substantially to a cavity in the body. One or more window assemblies are removably mounted on sides or ends of the body to retain and locate the cartridge within the body cavity. The cartridge can be removed from the body and replaced when either of the window assemblies has been removed. Each of the window assemblies includes a transparent window to allow visual inspection of fluid flow through the sight flow product. A fluid sensing device e.g., a flapper, rotor or condensation drip tube, can be mounted within the cartridge by connection to the cartridge itself or by connection to opposed alignment washers in the window assemblies to facilitate visually inspecting the fluid flow in the sight flow product.

34 Claims, 10 Drawing Sheets

SIGHT FLOW APPARATUS WITH CARTRIDGE

FIELD OF THE INVENTION

The present invention relates generally to sight flow products such as sight flow windows and indicators.

BACKGROUND OF THE INVENTION

Certain sight flow products are known which allow visual inspection of fluid levels and/or flow. These sight flow products generally comprise a body which is cast in one-piece from, e.g., cast iron, steel or bronze. The body has an inlet and an outlet which are attached, e.g. threaded, bolted, soldered or welded, in-line with fluid pipes cooperatively forming a fluid flow line in a manufacturing plant or other facility. A transparent window mounted to the side of the body allows visual inspection of the fluid flow through the sight flow product, and hence the fluid flow within the fluid flow line. For example, a typical high pressure sight flow indicator is manufactured by the assignee of the present invention under the Model No. F-910-HP.

Some of these sight flow products have a fluid sensing device or indicator, e.g., a rotor, flapper, or condensation drip tube, mounted within the body. For example, the rotor or flapper can be rotatably mounted on an axle extending between and supported either by the windows on the body of the indicator, or by the body itself. The fluid sensing device facilitates visually inspecting the fluid flow within the indicator. For example, the rotor facilitates inspecting fluid flow within a sight flow indicator from a distance; while the flapper provides a positive indication of the direction of fluid flow. The condensation drip tube is particularly suited to be used with condensing or distillation fluid flows and similar apparatus having an intermittent flow.

The above-mentioned sight flow indicators, however, typically have the fluid sensing device mounted directly to the body or to the windows in the body. Accordingly, the entire body must be removed from its in-line connection if it becomes necessary or desirable to replace the sight flow indicator with an indicator having a different type of fluid sensing device.

Removing the entire sight flow indicator body from its in-line connection can interrupt the functioning of at least a portion of the plant or manufacturing facility. Further, if the sight flow indicator is to be entirely replaced, it is believed that surplus bodies must generally be kept on-hand, which can further increase storage and inventory costs.

Moreover, mounting the fluid sensing device directly to the body or to the windows necessarily limits the type of fluid sensing device used with a particular sight flow indicator. As indicated previously, the fluid sensing device or indicator cannot be interchanged between other sight flow indicator bodies. It is further believed that the detail, adjustment, variety, tolerances, etc., which can be manufactured into the indicator body are also limited by current technology and cost considerations. Consequently, the overall flexibility of the above-mentioned sight flow indicators can be limited.

SUMMARY OF THE INVENTION

The present invention provides a multi-purpose sight flow indicator which is designed to be connected in-line with other fluid pipes within a manufacturing plant or other facility. The sight flow indicator includes a body and a removable cartridge located within the body. A fluid sensing device or indicator, e.g. a rotor, flapper, or condensation drip unit, can be mounted within the cartridge to facilitate inspecting the fluid flow through the sight flow indicator. The cartridge and/or the fluid sensing device can be easily removed from the body and replaced if the fluid sensing device is damaged or broken, or can be interchanged with other cartridges and other types of fluid sensing devices without removing the entire sight flow indicator body from its in-line connection. The removable cartridge and fluid sensing device reduce the inventory of sight flow products required, reduce maintenance time, and provide broad indicator adaptability to a given sight flow body.

The sight flow indicator includes a body having an inlet and an outlet which are connected by e.g., a threaded or welded connection to a fluid pipe, or by welded flanges. The flanges can then be bolted in-line to fluid pipes within a fluid flow line of a manufacturing plant or other facility. The cartridge is adapted to be located within and conform substantially to a cavity in the body. The cartridge has an inlet and an outlet which are adapted to allow fluid to flow through the cartridge when located within the body of the sight flow indicator.

One or more window assemblies are removably mounted to the sides or ends of the body. The window assemblies allow visual inspection of the fluid flow through the cartridge of the sight flow indicator. Each window assembly includes a transparent window removably secured to the body with a retainer. Each retainer, and hence each window, can be removed individually to allow removal and replacement of the cartridge and/or the fluid sensing device from either side (or end) of the body.

The fluid sensing device for the cartridge facilitates visually inspecting the fluid flow through the cartridge in the sight flow indicator. The fluid sensing device can comprise e.g., a rotor or flapper, which are rotatable relative to and supported within the cartridge, or a condensation drip tube assembled with the cartridge. Alignment washers forming part of the window assembly provide support for the rotor or flapper within the cartridge and orient the cartridge within the body of the sight flow indicator.

Accordingly, it is a basic object of the present invention to provide a sight flow product which allows visual inspection of the fluid flow through the sight flow indicator, and hence the fluid flow within pipes forming a fluid flow line in a manufacturing plant or other facility.

It is another object of the invention to provide a sight flow indicator having a removable cartridge, which can be removed and replaced without removing the entire sight flow indicator body from its in-line connection with the fluid pipes.

It is still another object of this invention to provide a sight flow indicator having a removable cartridge, wherein the cartridge can have one or more fluid sensing devices mounted therein. The cartridge and/or fluid sensing device(s) can be assembled within the body of the sight flow indicator after the sight flow indicator installation in the fluid line, and can be removed and replaced if damaged, broken or no longer required, or interchanged with other cartridges and other types of fluid sensing devices.

It is still another object of this invention to provide a sight flow indicator having a fluid sensing device which allows visual inspection of the fluid flow through the body of the indicator at a wide variety of flow rates.

Further objects and advantages of the present invention will become apparent from the following detailed description and accompanying drawings which form a part of the specification.

DETAILED DESCRIPTION OF THE PREFERRED EMBODIMENT

Figure 1:
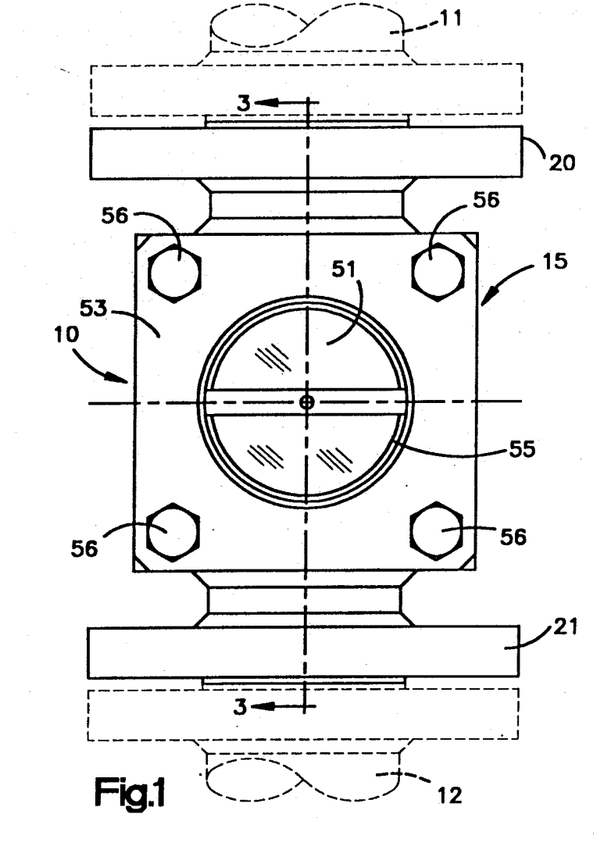
FIG. 1 is a front view of a sight flow indicator constructed according to the principles of the present invention illustrating a first type of cartridge assembly positioned within the body of the sight flow indicator.
Figure 2:
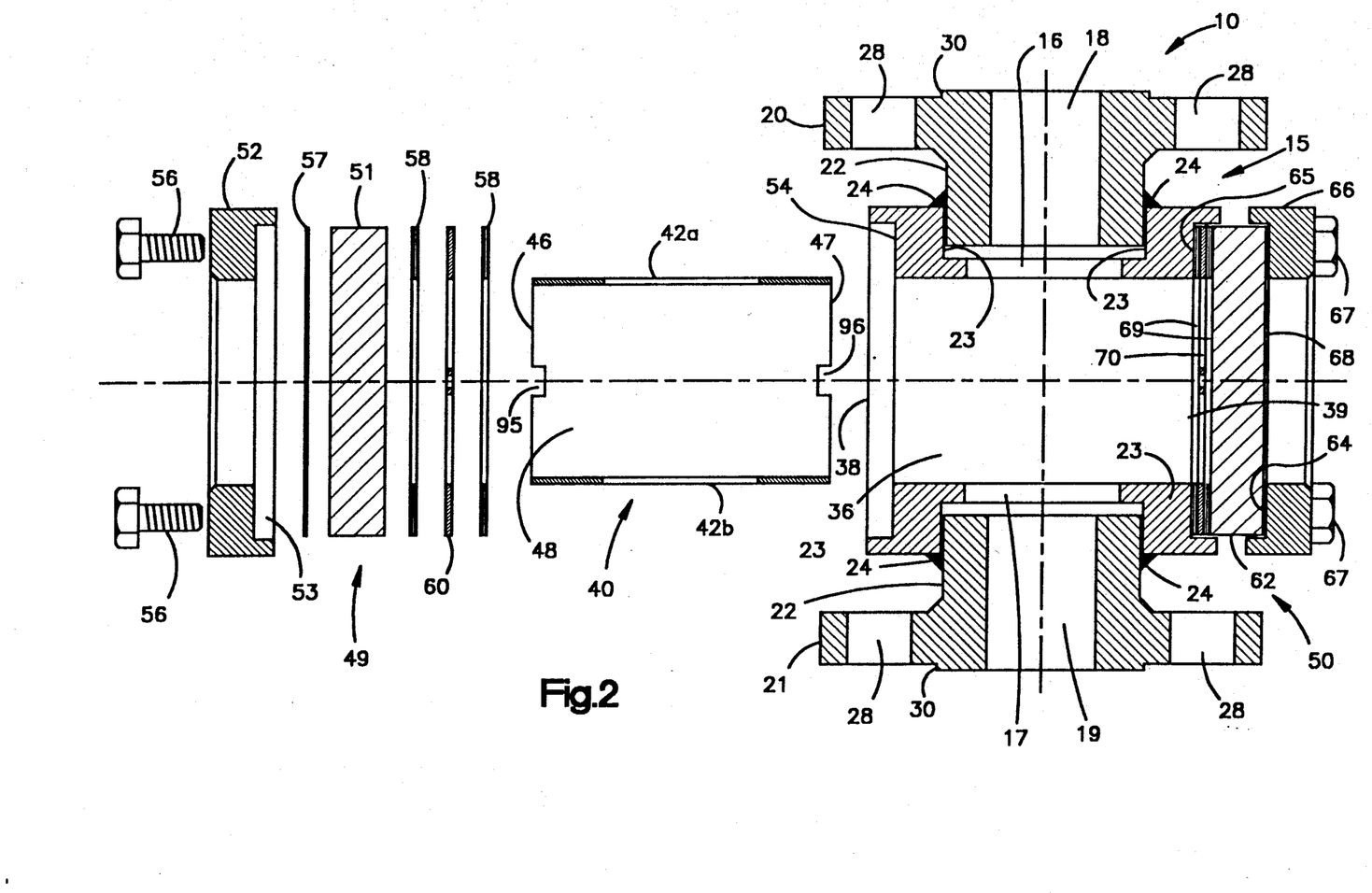
FIG. 2 is a cross-sectional, partially exploded view of the sight flow indicator of FIG. 1, illustrating the cartridge removed from the indicator body.
Figure 3:
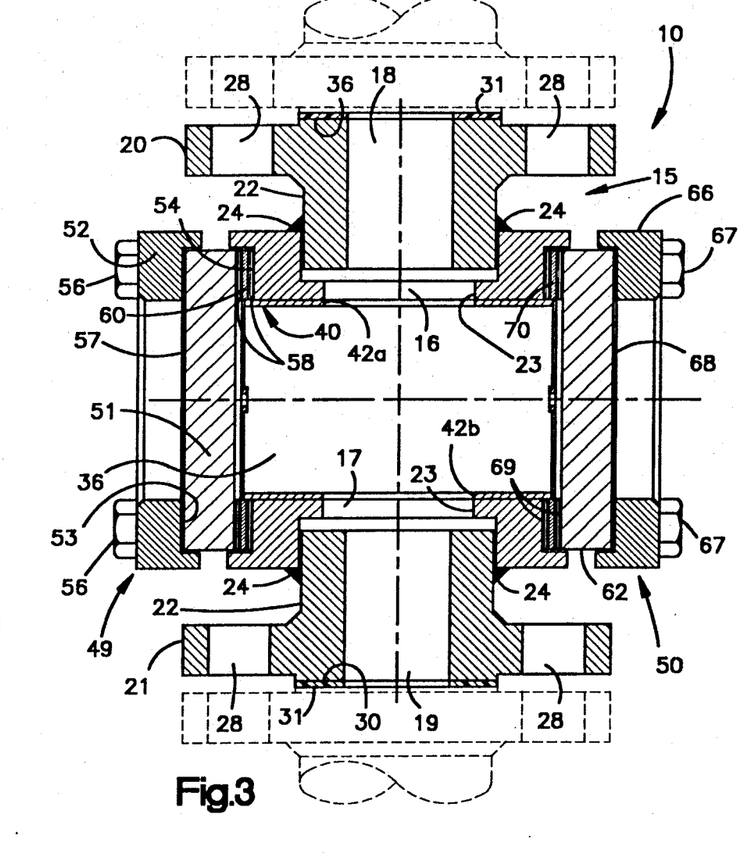
FIG. 3 is a cross-sectional side view of the sight flow indicator taken generally along the plane 3—3 of FIG. 1.

Referring to the drawings, and initially to FIGS. 1-3, a sight flow product, indicated generally at 10, is designed to be connected in-line to fluid pipes 11 and 12 cooperatively forming a fluid flow line in a manufacturing plant or other facility. The sight flow product 10 includes a body, indicated generally at 15, having an inlet bore 16, and an outlet bore 17. The body 15, inlet bore 16 and outlet bore 17 are preferably formed from metal or plastic, barstock, castings, moldings, fabrications or other appropriate material using techniques which are known to those skilled in the art.

FIG. 3 shows a fabricated body construction where the inlet and outlet bores 16, 17 of the body are preferably aligned with inlet and outlet bores 18 and 19 respectively, formed in flanges 20 and 21. Flanges 20, 21 each have a neck portion 22 which is received in a counterbore 23 formed in a wall of body 15. The flanges are welded at 24 to provide a fluid-tight enclosure. Each flange 20, 21 further includes circumferentially spaced holes 28 which are designed to receive fasteners respectively coupling flange 20 to the flange of inlet pipe 11 and flange 21 to the flange of outlet pipe 12

Additionally, flanges 20, 21 can include a raised face 30 which is designed to receive a gasket 31 to provide a fluid-tight seal between the body 15 and the flanges at the respective ends of the fluid-carrying pipes cooperatively forming the fluid line. It should be recognized by one skilled in the art the flanges 20, 21 are only an example of end connections commonly used in sight flow indicators. Alternate inlet and outlet constructions employ butt welded flanges, pipe threads, soldered, braze, socket weld and butt weld pipe ends, etc., to suit user piping connection requirements.

The bores 18, 19 of flanges 20 and 21 respectively, extend longitudinally therethrough and allow fluid to flow through the body of the sight flow product. In particular, bore 18 is designed to direct fluid through inlet bore 16 into a generally cylindrical cavity 36 formed in body 15, while outlet bore 17 is designed to direct fluid out of cavity 36 and through bore 19 in flange 21. Although the inlet and outlet flanges 20 and 21 are illustrated as being formed separately from body 15, it is anticipated that the flanges 20, 21 and body 15 can also be integrally formed in one piece.

The cavity 36 in body 15 comprises a generally cylindrical bore formed through the length of the body. The cavity extends substantially perpendicular to the inlet bore 18 of flange 20, and outlet bore 19 of flange 21. The cavity 36 in body 15 further includes open ends 38, 39 which are designed to allow a generally tubular or cylindrical cartridge, indicated generally at 40, to be removably located within cavity 36.

Figure 4A:
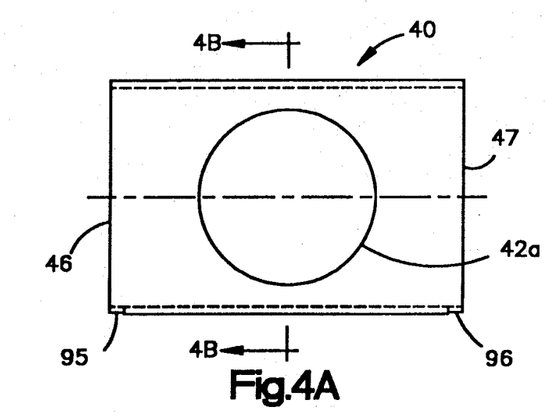
FIG. 4A is a front view of the first type of cartridge for the sight flow indicator.
Figure 4B:
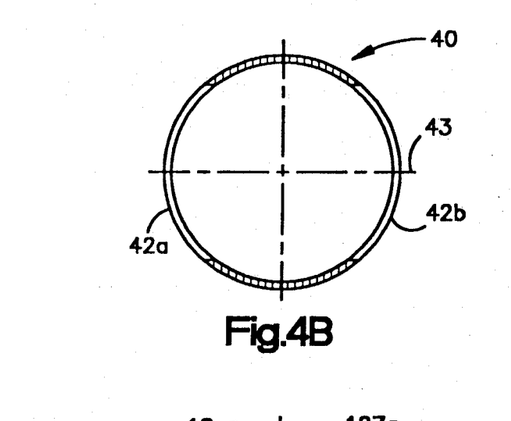
FIG. 4B is a cross-sectional end view taken generally along the plane 4B—4B of FIG. 4A.
Figure 5A:
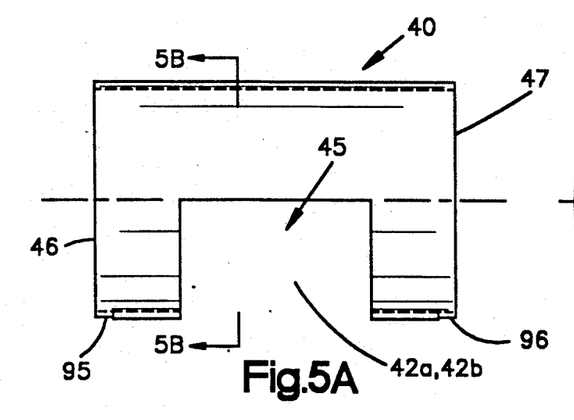
FIG. 5A is a front view of a second type of cartridge for the sight flow indicator.
Figure 5B:
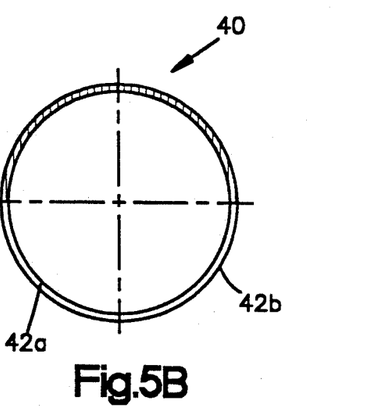
FIG. 5B is a cross-sectional end view taken generally along the plane 5B—5B of FIG. 5A.
Figure 6:
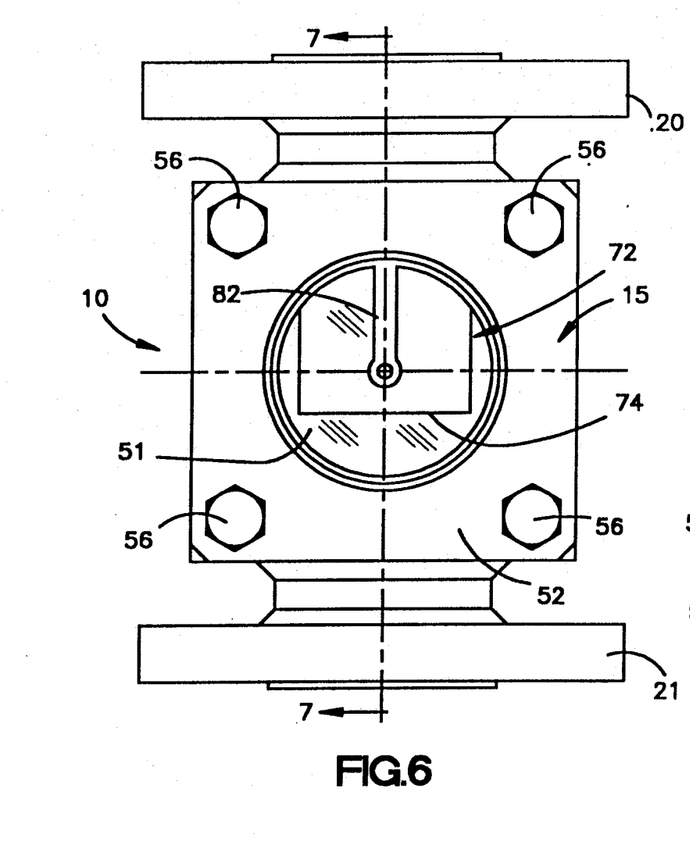
FIG. 6 is a front view of a sight flow indicator constructed according to the principles of the present invention illustrating a condensation drip tube positioned within the body of the sight flow indicator.
Figure 7:
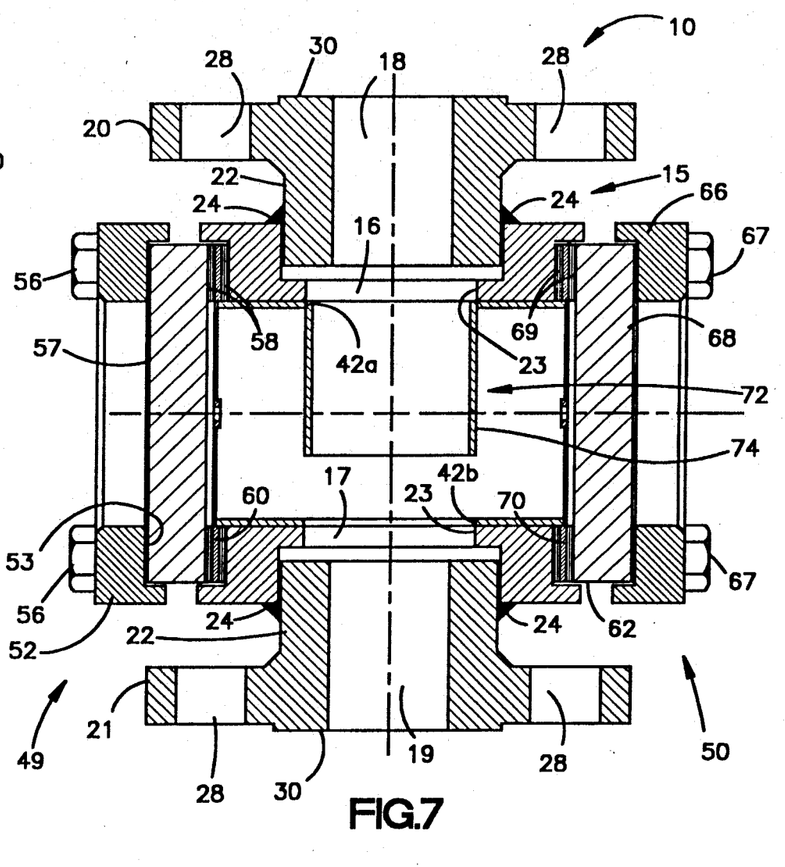
FIG. 7 is a cross-sectional side view of the sight flow indicator taken generally along the plane 7—7 of FIG. 6.

The tubular cartridge 40 is designed to conform substantially to the cylindrical cavity 36 in body 15. As illustrated in FIGS. 3, 4A and 4B, cartridge 40 includes generally circular inlet opening 42a and an outlet opening 42b. Alternatively, as illustrated in FIGS. 5A and 5B, a section, indicated generally at 45, can be cut through the diameter of the cartridge to enhance the flow characteristics within the cartridge, as will be discussed herein in more detail. In any case, the ends of the cartridge 40 are open to allow visual inspection of the interior of the cartridge.

Referring again to FIGS. 2 and 3, the cartridge 40 is designed to be located within cavity 36 of body 15. To this end, cartridge 40 is retained within body 15 by a pair of window assemblies, indicated generally at 49, 50. Each window assembly 49, 50 includes a transparent window, a retainer and sealing structure. For example, window assembly 49 includes window 51 and retainer 52. Window 51 is shown to be partially located within and interposed between a first counterbore 53 formed in a retainer 52, and a second counterbore 54 formed in body 15. Such counterbores are optionally used to locate, and partially enclose the window assembly.

Retainer 52 includes a circular opening 55 formed in one piece therewith to enable visual inspection of the cavity in the body. The retainer further includes a plurality of holes (not shown) adjacent its corners which are designed to receive fasteners 56, e.g. bolts, to secure the window assembly to the body 15.

Figure 1A:
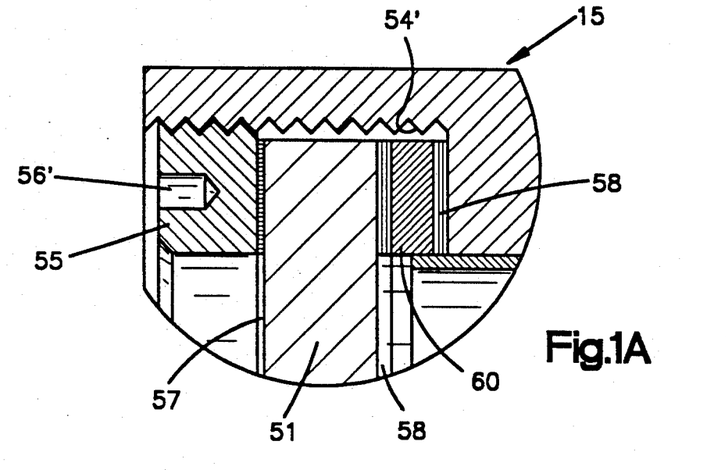
FIG. 1A is an enlarged partial cross sectional view of the sight flow indicator illustrating a retainer threadably secured to the body of the sight flow indicator.

The window assembly can be alternately retained by a threaded cover plate 55 received in a threaded second counterbore 54' (as depicted in FIG. 1A). In this case, tightening apertures 56 can be formed in cover plate 55 to facilitate attaching the cover plate to the body 15 in a conventional manner.

In any case, to provide a fluid-tight seal between the retainer 52 and body 15, a cushion 57 is compressed between the first counterbore or shoulder 53 in retainer 52 and the window 51, and a pair of gaskets 58 are compressed between window 51 and the second counterbore or shoulder 54 of body 15. The gaskets 58 surround a first alignment washer 60 which is adapted to provide alignment for the cartridge and in some instances support for fluid sensing devices mounted within the cartridge 40, as will be described herein in more detail.

A second window 62 is shown to be partially located in a first counterbore 64 formed in retainer 66 and a second counterbore 65 formed in body 15. Retainer 66 is similarly removably attached to body 15 with fasteners 67 to hold window 62 in position, although a threaded cover plate could also be used as indicated previously. A cushion 68 is located between first counterbore 64 in retainer 66 and window 62; while spaced gaskets 69 surround a second alignment washer 70 and are compressed between window 62 and second counterbore 65 to provide a fluid-tight seal. Second window 62 is commonly located opposite first window 52 on body 15.

Accordingly, when cartridge 40 is located within cavity 36, window assemblies 49, 50 are designed to orient and capture cartridge 40 within cavity 36. Fluid can flow between the inlet 18 and the outlet 19 in the flanges 20, 21 and through the inlet 42a and outlet 42b of cartridge 40. The windows 51, 62 allow visual inspection of the fluid flow through the cartridge 40, and hence within the fluid pipes. As illustrated in FIGS. 1-3, a fluid sensing device has not been mounted on the opposed first and second alignment washers 60 and 70, respectively. As such, the sight flow product with cartridge 40 is acing as a sight window, with ready adaptability to being a sight flow indicator, if desired.

In FIGS. 1-3, to remove the cartridge 40, fasteners 56 and retainer 52 are removed, along with cushion 57, window 51, gaskets 58, and alignment washer 60 from one end 38 of the body; or alternatively, fasteners 67 and retainer 66 are removed, along with cushion 68, window 62, gaskets 69 and alignment washer 70 from the other end 39 of the body. The cartridge 40 can then be removed from the cavity 36 from the selected open end of the body and replaced, repaired or interchanged with other cartridges, as the case may be. However, it is also anticipated that the sight flow product 10 can be used effectively without a cartridge. In this case, fluid would enter cavity 36 directly through inlet bore 16 and exit through outlet bore 17.

Nevertheless, cartridge 40 provides important features and flexibility for the sight flow indicator 10. In particular, the cartridge 40 can include a fluid sensing device or indicator, for example as indicated generally at 72 in FIGS. 6-9. The fluid indicator can be mounted to the cartridge itself or it can be mounted to and extend between a diametrically or radially extending spoke support 82 provided on each of the alignment washers 60 and 70.

For example, the fluid sensing indicator 72 for cartridge 40 can include a condensation drip tube 74 assembled into cartridge 40 and extending inwardly from inlet 42a. Condensation drip tube 74 is substantially cylindrical in shape and has an outlet 75 which extends into the cartridge 40. For this type of fluid sensing device, inlet 42a and outlet 42b are preferably circular in shape and are located on opposite sides of cartridge 40.

Figure 10:
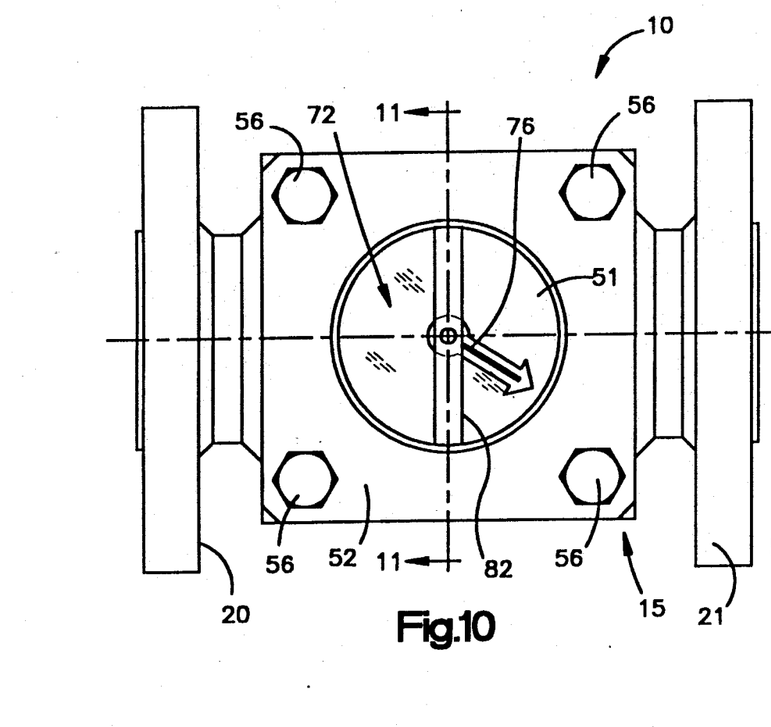
FIG. 10 is a front view of a sight flow indicator constructed according to the principles of the present invention, illustrating a flapper positioned within the body of the sight flow indicator.
Figure 11:
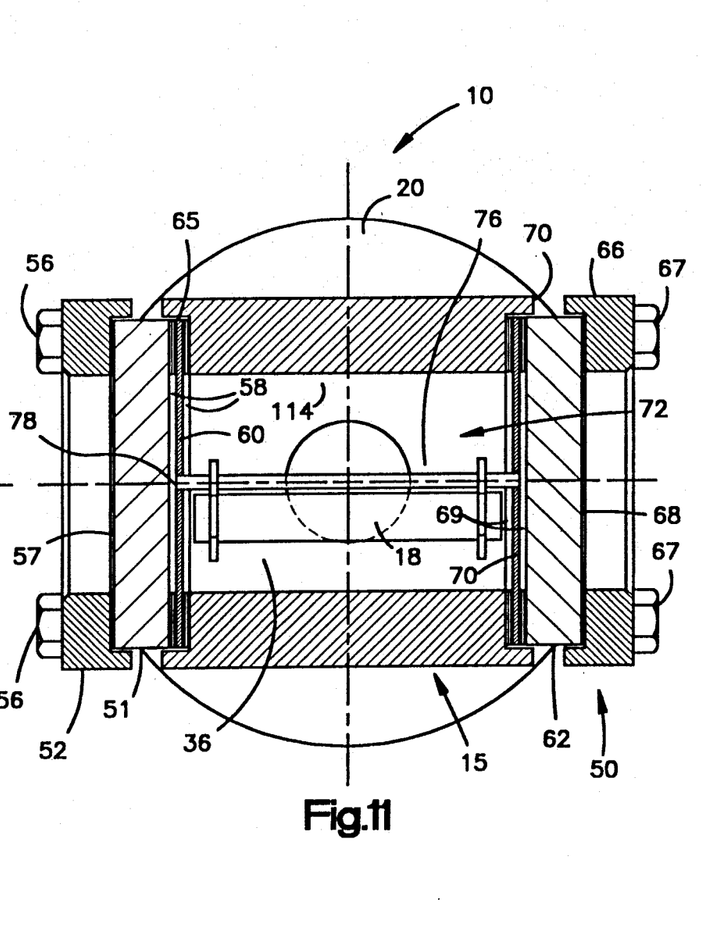
FIG. 11 is a cross-sectional end view of the sight flow indicator taken along the plane of 11—11 of FIG. 10.

Alternatively, referring now to FIGS. 10 and 11, the fluid sensing device 72 can comprise a flapper 76. Flapper 76 preferably comprises a pointing member which is mounted on an axle 78. Axle 78 extends between and is rotatably supported by the spoke supports 82 on the alignment washers 60, 70 located on opposite sides of body 15. It will be appreciated that the indicator may, e.g. be rotatably mounted to a rotatable shaft or fixedly secured to a rotatable shaft. According to this aspect of the invention, the flapper 76 can be used with or without a cartridge 40.

Flapper 76 provides a visual indication of the direction of fluid flow within the sight flow indicator as its shaped design forces the flapper to respond by rotating in the direction of fluid flow. Upon visual inspection through either of windows 51, 62, the pivotal movement of flapper 76 toward the outlet provides a quick and easy indication of the direction of fluid flow within the sight flow indicator 10.

Figure 12:
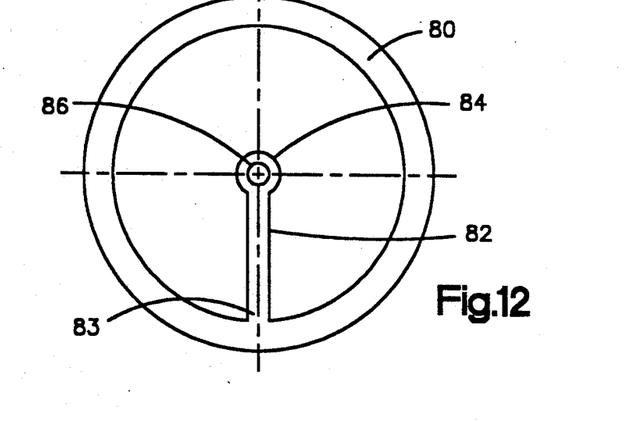
FIG. 12 is an elevation of an alignment washer for the cartridge assembly of a sight flow indicator.

The alignment washers 60 and 70 may take several different designs. Referring now to FIG. 12 for the preferred embodiment, each alignment washer comprises a generally ring-like frame 80 having a spoke support 82 extending radially inwardly toward the central axis of the frame 80. The base or the spoke support 82 also serves as an alignment feature 83. The spoke support 82 includes an outer distal end having a knob 84 with an aperture 86 formed therein. Alternatively, spoke support 82 can extend across the diameter of the ring-like frame 80 and be attached at both ends, as illustrated in FIG. 1.

Figure 12A:
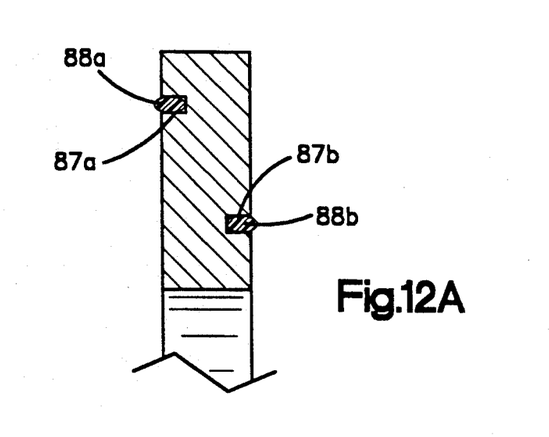
FIG. 12A is a partial sectional view of a second type of alignment washer for the cartridge assembly of the sight flow indicator.

The alignment washers are preferably formed from a sheet of rigid material and is substantially flat in side view. However, as illustrated in FIG. 12A, the washers 60, 70 can have a width which is substantial enough to allow a pair of grooves 87a, 87b, to be formed at selected locations circumferentially around opposite sides of the washer. The grooves 87a, 87b are each designed to receive seal O-rings 88a, 88b respectively, which are adapted to seal against the body 15 and a respective window when the window assembly is mounted to the body. Accordingly, if a vacuum is drawn within the sight flow indicator, the alignment washers with O-rings provide a vacuum-tight seal between the body and the window assemblies.

Figure 13:
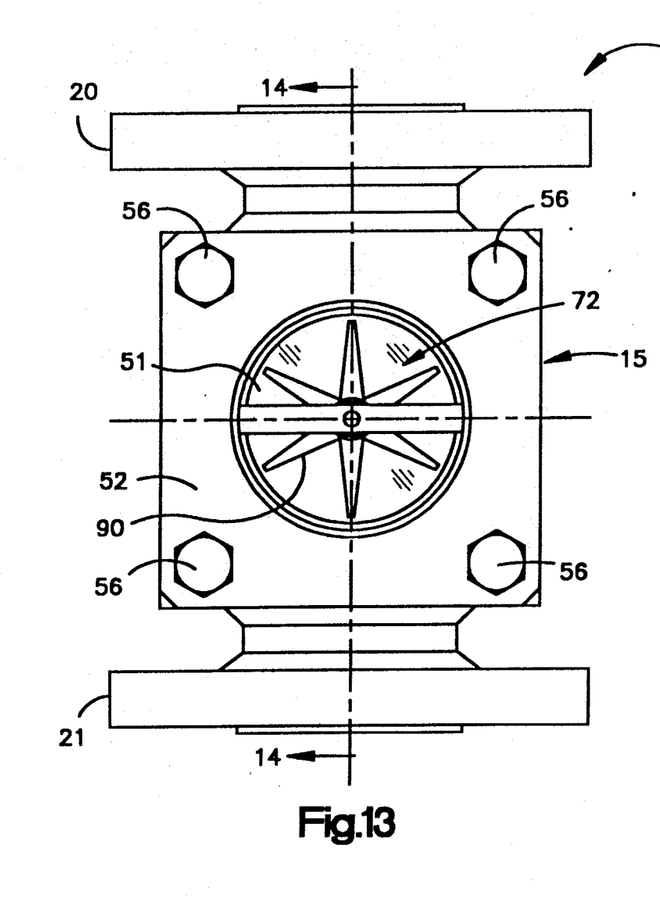
FIG. 13 is a front view of a sight flow indicator constructed according to the principles of the present invention, illustrating a rotor positioned within the body of the sight flow indicator.
Figure 14:
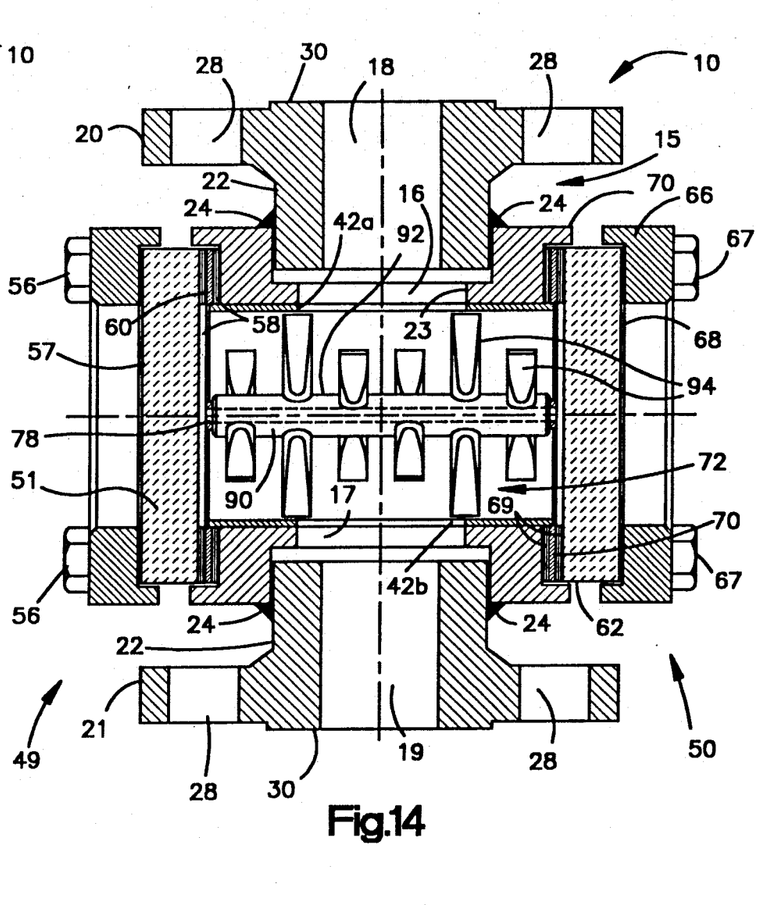
FIG. 14 is a cross-sectional side view of the sight flow indicator taken generally along the plane 14—14 of FIG. 13.

Further, as illustrated in FIGS. 13 and 14, the fluid sensing device or indicator 72 can alternatively comprise a rotor 90. Rotor 90 preferably comprises a tubular sleeve 92 having a plurality of vanes 94 extending radially outwardly from selected locations along the sleeve. Sleeve 92 is also mounted on axle 78, which extends between and is rotatably supported by the spoke supports of alignment washers 60, 70 on opposite sides of body 15. Rotor 90 is adapted to allow visual inspection through windows 50 or 62 of the rate of flow within the sight flow indicator 10. Alternatively, the rotor 90 can be electronically coupled to a flow monitor to convert the speed of rotor rotation to a numeric display of the velocity of fluid flow.

Figure 8:
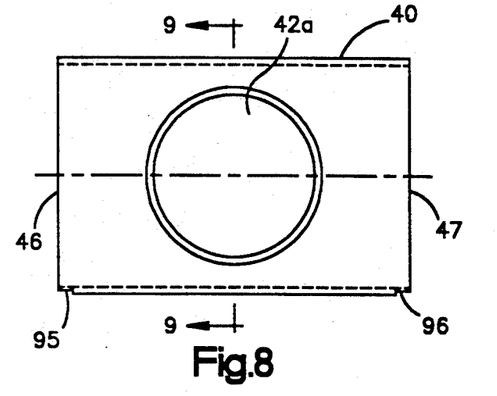
FIG. 8 is a front view of the first cartridge for the sight flow indicator with a condensation drip tube.
Figure 9:
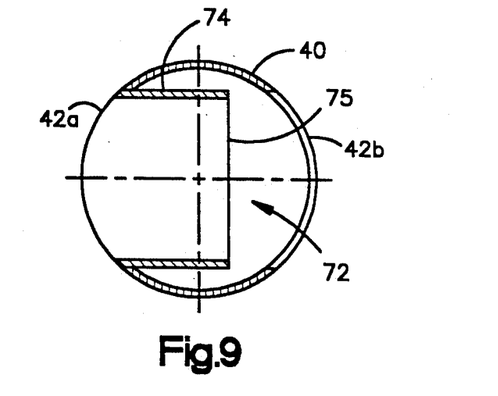
FIG. 9 is a cross-sectional end view of the cartridge taken generally along the plane 9—9 of FIG. 8.

The inlet 42a and outlet 42b of the cartridge (either circular as in FIGS. 4A, 4B; or sectioned as shown in FIGS. 5A, 5B) direct fluid flow circumferentially through the cartridge 40. Cartridge 40 can be rotated within cavity 36 relative to the inlet and outlet pipes to precisely direct the fluid flow through the inlet 42a and outlet 42b. To this end, as illustrated in FIG. 8, the cartridge 40 includes alignment notches 95 and 96 formed in each end of the cartridge. For example, an alignment notch 95 (FIG. 17) is formed in one end 46, while alignment notch 96 is formed in the other end 47. The alignment notches 95, 96 are adapted to be aligned with and receive the alignment feature 83 of spoke support 82 on the alignment washers 60, 70. The alignment feature 83 locates the cartridge 40 when the cartridge is properly positioned within the sight flow indicator.

Accordingly, the particular circumferential orientation of the alignment feature 83 on the alignment washers 60, 70 determines the orientation of the cartridge 40 within the cavity 36, and hence the location of inlet 42a and outlet 42b on the cartridge. Adjusting the location of the inlet 42a and the outlet 42b provides some control over the direction of fluid flow through the cavity 36 by circumferentially directing the fluid flow through the cartridge.

By adjusting the orientation of the cartridge and thereby the direction of fluid flow through the cartridge, the fluid sensing devices, and in particular the rotor 90 illustrated in FIGS. 13, 14, can operate more effectively over a wide range of fluid rates. By constricting the openings 42a, 42b higher velocity flow actuates the sensing devices correctly at lower than normal flow rates. Conversely, adjusting the cartridge for greater opening at 42a, 42b reduces costly pressure drops across the sight flow indicator at higher than normal flow rates. Consequently, inserting a cartridge within the cavity 36 and adjusting the orientation of the inlet and outlet of the cartridge with respect to the sight flow indicator increases the flexibility of the sight flow indicator by allowing inspection of a wider variety of flow rates in fluid pipes.

In any of the above examples, the fluid sensing device 72 and/or cartridge 40 can be removed from cavity 36 in body 15 and replaced. Accordingly, if the fluid sensing device 72 becomes damaged or broken, a replacement fluid sensing device and/or cartridge can be easily located within body 15 without removing body 15 from its in-line connection. Moreover, the fluid sensing devices and cartridges can be interchanged to provide flexibility in choosing an appropriate fluid sensing device or can be omitted.

Figure 15:
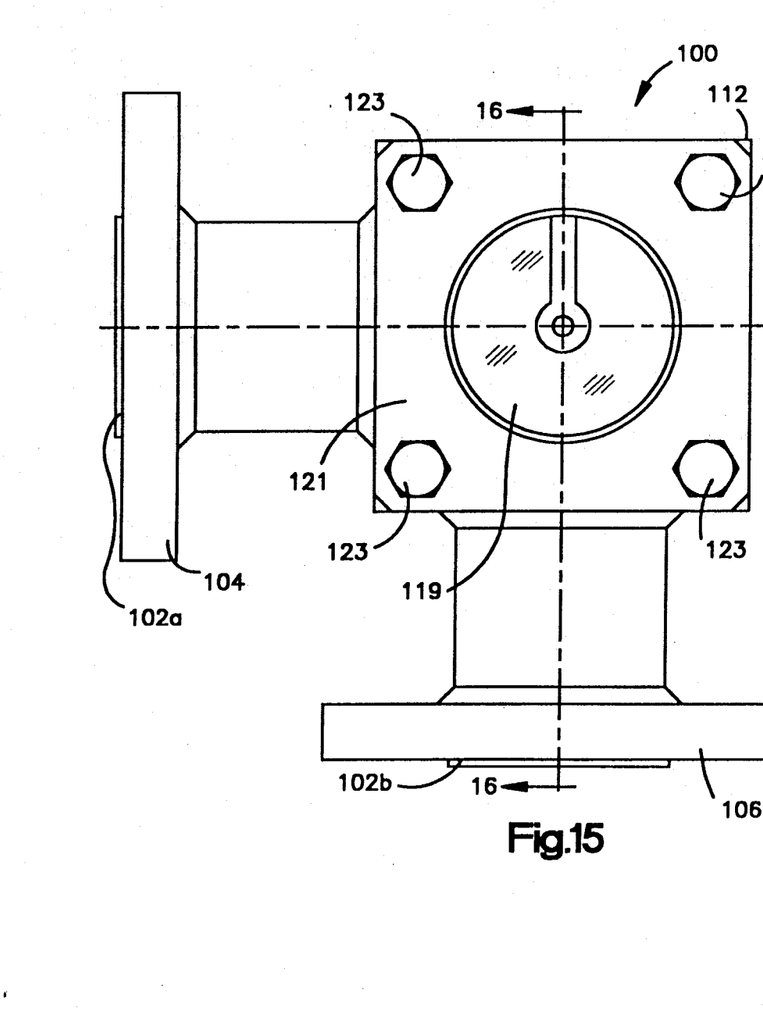
FIG. 15 is a front view of another embodiment of the sight flow indicator with a 90° fluid flow bend between the inlet and the outlet.
Figure 16:
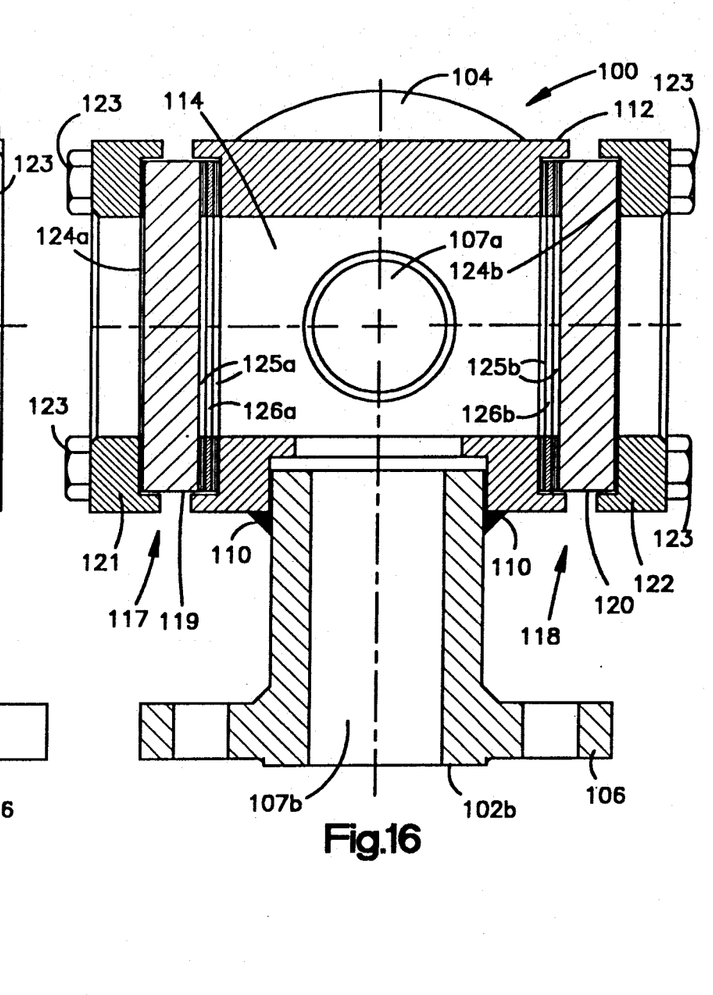
FIG. 16 is across-sectional end view of the sight flow indicator taken along the plane 16—16 of FIG. 15.

According to another embodiment of the invention, as illustrated in FIGS. 15 and 16, the sight flow product, indicated generally at 100, can have a 90° bend between the fluid inlet 102a and fluid outlet 102b. The 90° bend facilitates inserting the sight flow product between fluid pipes which intersect at a perpendicular angle. In all other respects, however, the sight flow product 100 in the second embodiment is constructed using the same principles and techniques as the sight flow product described in the first embodiment.

For example, the sight flow product 100 can have inlet and outlet flanges 104, 106, respectively, which are designed to be attached in-line to fluid pipes forming a fluid flow line within a manufacturing plant or other facility. The inlet flange 104 includes a fluid inlet bore 107a and the outlet flange 106 includes a fluid outlet bore 107b. The flanges 104, 106 are attached, e.g. soldered or welded, at 110 to body 112.

Figure 17:
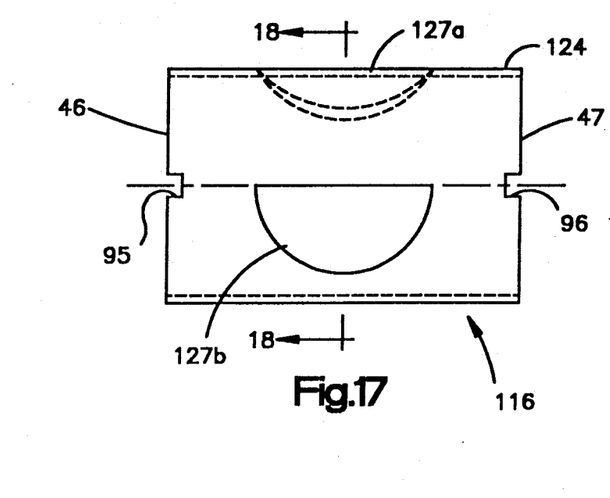
FIG. 17 is a front view of a third type of cartridge for the sight flow indicator shown in FIG. 16.
Figure 18:
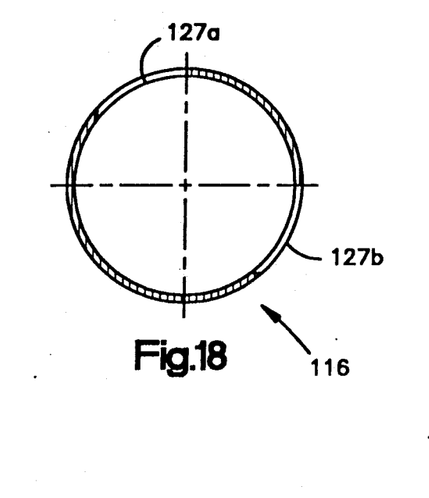
FIG. 18 is a cross-sectional end view of the cartridge taken generally along the plane 18—18 of FIG. 17.
Figure 19:
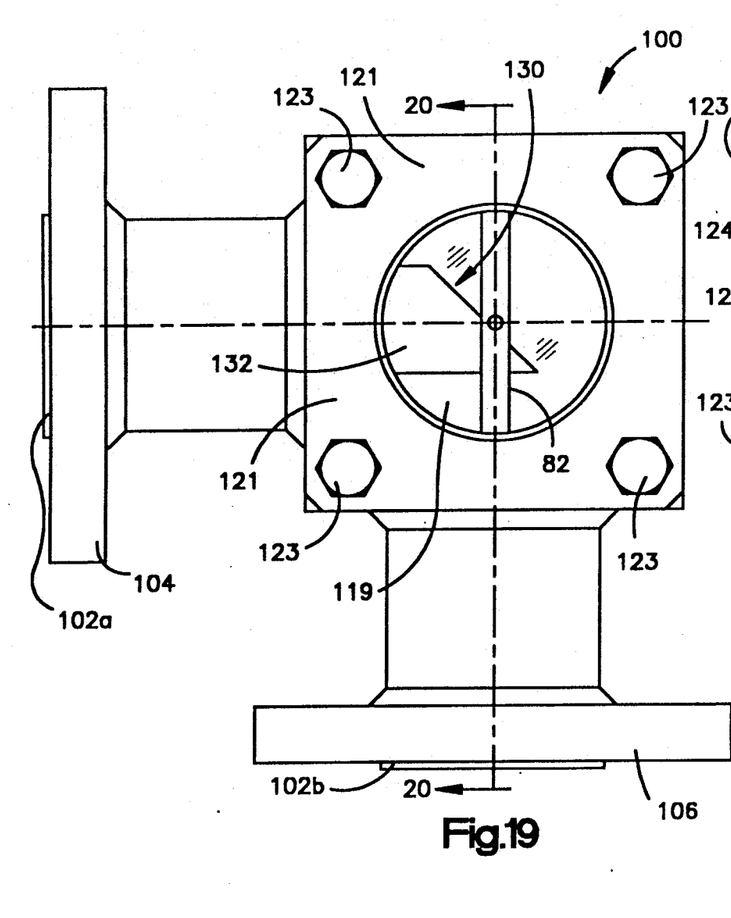
FIG. 19 is a side view of the sight flow indicator shown in FIG. 15, illustrating a condensation drip tube positioned within the sight flow indicator.
Figure 20:
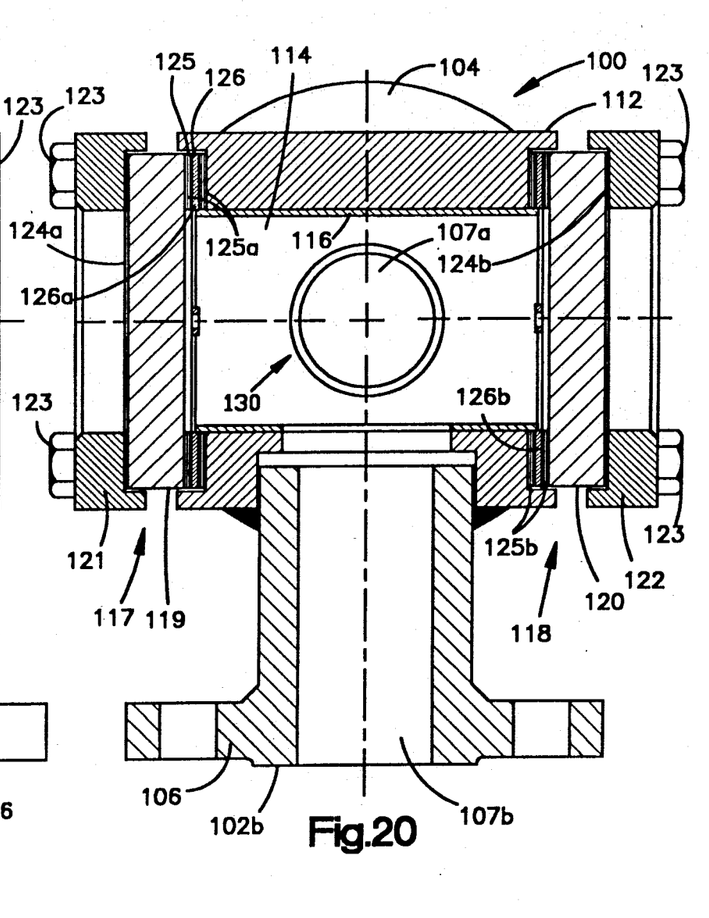
FIG. 20 is a cross-sectional end view of the sight flow indicator taken generally along the plane 20—20 in FIG. 19.

The body 112 further includes a cavity 114 which is designed to receive a cartridge, for example as indicated generally at 116 in FIGS. 17, 18. Cartridge 116 is designed to be located within and conform substantially to cavity 114 of body 112. To this end, as illustrated in FIGS. 19, 20, cartridge 116 is oriented and supported within cavity 114 by a pair of window assemblies, indicated generally at 117, 118, located on opposite sides of body 112. Window assemblies 117, 118 include transparent windows 119, 120 respectively, which are removably mounted to body 112 with retainers 121, 122 respectively. Fasteners preferably 123 secure the window assemblies to the body 112 (although a threaded cover plate can also be used). Either of the window assemblies 117, 118 can be individually removed, to allow the cartridge to be removed from either side of the sight flow indicator body.

To provide a fluid-tight seal between windows 119, 120 and body 112, cushions 124a, 124b respectively, are located between the retainers 121, 122 and the respective windows 119, 120; while gaskets 125a and 125b are located on opposite sides of alignment washers 126a, 126b respectively, and are interposed and compressed between windows 119, 120 and body 112. Windows 119, 120 allow visual inspection of the fluid flow within the cavity 114 of the sight flow indicator.

Figure 21:
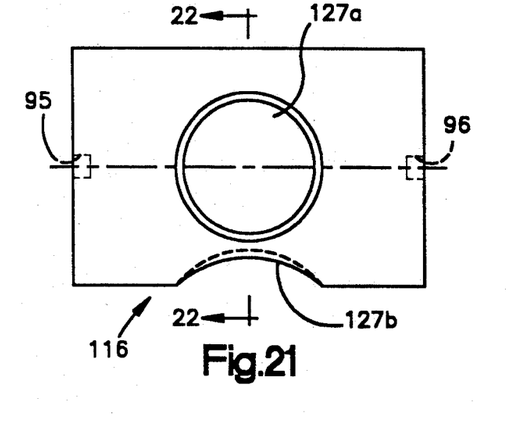
FIG. 21 is a front view of the third type of cartridge for the sight flow indicator of FIG. 19 with the condensation drip tube.
Figure 22:
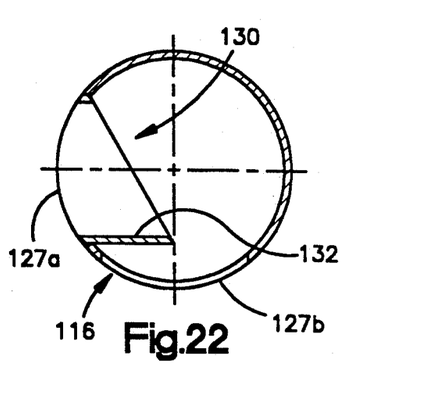
FIG. 22 is a cross-sectional end view of the cartridge taken generally along plane 22—22 of FIG. 21.

The cartridge 116 includes an inlet 127a and an outlet 127b, as illustrated in FIGS. 21, 22. Because of the 90° bend in the sight flow indicator, the inlet 127a is formed at a substantially perpendicular angle to the outlet 127b (see e.g., FIG. 17). Moreover, to more accurately direct the fluid through the cartridge, the inlet 127a and outlet 127b can have a semi-circular shape, as illustrated in FIGS. 17 and 18. The inlet 127a is designed to be aligned with the inlet bore 107a of flange 104, while outlet 127b is designed to be aligned with the outlet bore 107b of flange 106. The cartridge 116 also includes alignment notches 95, 96 which are designed to mate with and receive the alignment feature 83 of spoke support member 82 (FIGS. 12, 19) of opposed alignment washers 126a, 126b when the cartridge is properly located between window assemblies 117, 118 and within body 112. The alignment notches 95, 96 align and locate the cartridge 116 properly within cavity 114 of the sight flow indicator. Adjustment of the position of the alignment washers allows adjustment of the cartridge relative to the body cavity and thus adjustment of the fluid flow through the cartridge, as described previously.

As illustrated in FIGS. 19–22, the cartridge 116 can include a fluid sensing device, indicated generally at 130. For example, a condensation drip tube 132 can be assembled with inlet 127a of cartridge 116. Condensation drip tube 132 extends inwardly within the cartridge 116. Alternatively, a rotor such as the kind indicated at 90 in FIG. 13, or a flapper such as the kind indicated at 76 in FIG. 10, can be located within the cavity 114 of the sight flow indicator and provide a visual indication of the flow rate or of the flow direction within the sight flow indicator. The rotor or flapper can be mounted on a axle which can extend between and be rotatably supported by the respective spoke supports on the alignment washers 126a, 126b positioned on opposite sides of body 112.

As in the first embodiment, the cartridge 116 and/or the fluid sensing device 130 can be removed from the cavity 114 in the sight flow indicator by removing either window assembly 117, 118 and thereafter removing, modifying and/or replacing the cartridge and/or the fluid sensing device.

Accordingly, in any of the embodiments illustrated above, the sight flow indicator allows visual inspection of the fluid flow within a fluid line in a manufacturing plant or facility. Additionally, the cartridge can easily be modified to include a fluid sensing device to facilitate visually inspecting the fluid flow through the sight flow indicator, and hence within the fluid pipes. Different types of fluid sensing devices can be used with the same cartridge, which allows broad adaptability.

Further, the cartridge and/or the fluid sensing device can be removed or replaced when broken or damaged without removing the entire sight flow indicator body from its in-line connection. Finally, the fluid sensing devices can be interchanged with other cartridges, which increases the flexibility in choosing a cartridge having a particular fluid sensing device for the sight flow indicator or a particular flow path.

Although the invention has been shown described with respect to a certain preferred embodiment, it is obvious that equivalent alterations and modifications will occur to others skilled in the art upon their reading and understanding of the specification. For example, the principles of the present invention could be used for fluid analyzing instruments employing window devices, such as turbidimeters, nephelometers, calorimeters, and cartridge valves employing a window part for fluid access, if desired. The present invention includes all such equivalent alterations and modifications, and is limited only by the scope of the following claims.

What is claimed is:

1. A sight window device comprising:
   a body having a cavity and a first fluid inlet to and a first fluid outlet from the cavity, said body also having an inspection opening communicating with the cavity,
   a hollow cartridge located within the cavity and enclosed by said body, said cartridge having a configuration such that said cartridge can be removed from the body cavity through said inspection opening, said cartridge having a second fluid inlet generally aligned with said first fluid inlet of said body, and a second fluid outlet generally aligned with said first fluid outlet of said body, said cartridge further having an open end generally aligned with the inspection opening to allow inspection of the interior of the cartridge, and
   a window assembly removably mounted to said body for enclosing and sealing said inspection opening, said window assembly comprising i) an alignment means for engaging at least a portion of said cartridge to maintain said cartridge in a predetermined orientation relative to said body, ii) a window for allowing inspection of fluid flow through the interior of said cartridge when said cartridge is located within the body cavity, and iii) a retainer means for removably mounting and sealing said window to said body and for enabling removal of said window from said body to allow insertion and removal of said cartridge from the cavity in said body.

2. A sight window device as in claim 1, further including a fluid sensing device mounted within said cartridge, said fluid sensing device being visible through said window and being adapted to indicate fluid flow through said cartridge when said cartridge is located in the body cavity.

3. A sight window device as in claim 2, wherein said window is interposed between said body and said retainer means.

4. A sight window device as in claim 3, wherein said window assembly further includes a cushion located between said retainer means and one side of said window, and at least one sealing member located between said body and the other side of said window, said cushion and said sealing member providing a fluid-tight seal between said retainer means and said window, and between said window and said body.

5. A sight window device as in claim 4, wherein said retainer means includes attachment apertures, said attachment apertures receiving fasteners to removably mount said retainer means to said body.

6. A sight window device as in claim 4, wherein said retainer means includes a threaded portion and said body includes a corresponding threaded portion, said threaded portions of said retainer means and said body cooperating with each other to removably mount said retainer means to said body.

7. A sight window device as in claim 4, wherein said alignment means is interposed between the open end of said cartridge and said window and is secured by said retainer means within said body against rotation with respect to said body, said alignment means engaging a portion of said cartridge and preventing rotation of said cartridge within said body cavity.

8. A sight window device as in claim 7, wherein said alignment means includes integral sealing means to provide a vacuum-tight seal between said window and said body.

9. A sight window device as in claim 7, wherein said body includes a first counterbore and said retainer means includes a second counterbore, said window, cushion, sealing means, and alignment means being at least partially received within and interposed between said first and second counterbores.

10. A sight window device as in claim 4 wherein said body further includes a second inspection opening communicating with the cavity, and said cartridge includes a second open end generally aligned with said second inspection opening to allow inspection of the interior of the cartridge, and further including a second window assembly removably mounted to said body for enclosing and sealing said second inspection opening, said second window assembly also having (i) an alignment means which engages a portion of the cartridge to maintain the cartridge in a predetermined orientation relative to the body; (ii) a second window to allow visual inspection of fluid flow through said cartridge when said cartridge is located in said predetermined orientation within the body cavity, and (iii) a second retainer means which removably mounts and seals said second window to said body, said second retainer means being removable to allow removal of said second window to allow insertion and removal of said cartridge from the cavity in said body.

11. A sight window device as in claim 10, wherein said first and second window assemblies are removably mounted on opposite sides of said body.

12. A sight window device as in claim 4, wherein said first fluid inlet and said first fluid outlet of said body are located on opposite sides of said body.

13. A sight window device as in claim 4, wherein said first fluid inlet of said body is located substantially perpendicular to said first fluid outlet.

14. A sight window device as in claim 3 further including an inlet and outlet fluid conduit, said fluid inlet and outlet of said body being coupled between said inlet and outlet fluid conduits.

15. A sight window device as in claim 7, further including a fluid sensing device located within said cartridge, said alignment means having a generally radially extending support member received within an alignment notch in said cartridge to at least partially support said fluid sensing device within said cartridge in the predetermined orientation in the body cavity.

16. A sight window device as in claim 15, further including a second window assembly, wherein said first and second window assemblies are mounted to opposite sides of the body, said fluid sensing device extending between and being at least partially supported by both of said first and second window assemblies.

17. A sight window device as in claim 16, wherein said fluid sensing device is mounted on an axle within said cartridge, said axle being rotatably supported between said first and second window assemblies.

18. A sight window device as in claim 16, wherein each of said first and second window assemblies includes a transparent window removably mounted to said body.

19. A sight window device as in claim 17, wherein said alignment means includes an annular frame having a generally radially extending support member, said support member at least partially supporting said axle.

20. A sight window device as in claim 19, wherein each of said first and second window assemblies includes a transparent window and alignment means interposed between the body and said window in each window assembly.

21. A sight window device as in claim 19, wherein said cartridge comprises a tubular member having an open end, and at least one alignment aperture formed in said tubular member at the open end, said at least one alignment aperture receiving said support member to align said cartridge in a predetermined orientation within the body cavity.

22. A sight window device as in claim 21, wherein said fluid inlet in said cartridge has a fluid opening with a configuration which directs the fluid flow path through said cartridge.

23. A sight window device as in claim 22, wherein said fluid sensing device includes a rotor, said rotor being rotatably mounted on said axle.

24. A sight window device as in claim 21, wherein said fluid sensing device comprises a flapper, said flapper being rotatably mounted on said axle.

25. A sight window device as in claim 7, wherein said alignment means includes a generally radially extending support member, and said cartridge comprises a tubular member having an open end, and an alignment notch formed in the open end of said cartridge for receiving said support member to align said cartridge in said predetermined orientation.

26. A sight window device as in claim 25, wherein said alignment means comprises a generally annular ring-shaped member, said ring-shaped member being selectively rotatable relative to said body to adjust the location of said second fluid inlet and said second fluid outlet of said cartridge with respect to the first fluid inlet and second fluid outlet of said body.

27. An sight window device as in claim 26, wherein said cartridge includes a fluid sensing device, said fluid sensing device having a condensation drip tube assembled into said cartridge, said cartridge having an alignment aperture to align said cartridge in a predetermined orientation within the cavity of said body.

28. A sight window device comprising:
a body having a cavity with a first fluid inlet and a first fluid outlet and inspection openings communicating with the cavity,
a removable hollow cartridge received in said cavity and having a second fluid inlet generally aligned with said first fluid inlet and a second fluid outlet generally aligned with said first fluid outlet, said cartridge further having open ends which are aligned with said inspection openings to allow inspection of the interior of the cartridge; and
a pair of window assemblies removably mounted to said body over said inspection openings, each of said window assemblies comprising (i) a transparent window, (ii) a sealing means interposed between said window and said body for sealing each transparent window to said body, (iii) fastening means for removably mounting each window assembly to said body, and (iv) an alignment means for aligning said cartridge in a predetermined orientation in said body cavity, said alignment means comprising a radially extending spoke support member, said radially extending spoke member and said cartridge having cooperating portions which maintain said cartridge in a predetermined rotational orientation in the cavity, said spoke support member also having a portion which supports a flow detection device in the body cavity.

29. A sight flow indicator comprising:
a body having a cavity with at least one fluid inlet to and one fluid outlet from the cavity and an inspection opening communicating with the cavity,
a window assembly having i) a fastening means for removably mounting said window assembly to said body over said inspection opening, ii) a window to allow visual observation of fluid flow through the cavity, and iii) an alignment means having a support member for supporting a hollow cartridge, and
said cartridge removably positioned in said body cavity, said cartridge having an open end which is generally aligned with said inspection opening of said body to allow observation of the interior of the cartridge, and a second inlet and a second outlet generally aligned with said fluid inlet and fluid outlet of said body, said cartridge further containing a flow indication device positioned in the interior of the cartridge, said support member of said alignment means and said cartridge having cooperating portions which maintain said cartridge in a predetermined rotational orientation within the cavity in the body.

30. A sight window device, comprising:

a body having a cavity with a fluid inlet to and a fluid outlet from the cavity, said body having a pair of inspection orifices which allow visual inspection of the fluid flow through the cavity in said body, a removable hollow cartridge located within the cavity in said body, said removable cartridge having a pair of inspection openings generally aligned with the inspection orifices in said body, and a second inlet and a second outlet generally aligned with said fluid inlet and fluid outlet of said body, a pair of window assemblies removably mounted to said body and covering said orifices, each of said window assemblies including (i) an alignment means having a portion which cooperates with a portion of said cartridge for maintaining the cartridge in a predetermined orientation relative to the body, (ii) a transparent window, (iii) means for sealing each window to said body, and (iv) means for removably mounting each of said windows to said body, each of said windows allowing visual inspection of fluid flow through the cavity in said body, and each of said windows being removable for allowing access to said cavity to insert and remove said cartridge.

31. A sight window device as in claim 30, further including a fluid sensing device located within the cavity of said body and supported by said alignment means of each window assembly, said fluid sensing device adapted to provide a visual indication through each of said windows of fluid flow in said body.

32. A method for assembling a sight window device, comprising the steps of:

providing a body having a cavity with a first fluid inlet to and a first fluid outlet from the cavity, the cavity also having two open ends, inserting a hollow cartridge through one of said two open ends of said cavity and locating said cartridge within said cavity in said body, said cartridge having a second fluid inlet which can be generally aligned with said first fluid inlet of said body and a second fluid outlet which can be generally aligned with said first fluid outlet of said body to allow fluid flow through said cartridge, said cartridge further including an open end to allow observation of the interior of said cartridge, mounting a window assembly over each of said two open ends in said body to enclose said cartridge within the cavity, each of said window assemblies having an alignment device which engages a portion of said cartridge and cooperates with the cartridge to locate and maintain the cartridge in a predetermined rotational orientation in the cavity in the body, said window assemblies allowing visual inspection of fluid flow through the open end of said cartridge and allowing insertion and removal of said cartridge from said cavity when either of said two window assemblies is removed.

33. A method as in claim 32, wherein said step of locating said cartridge within said cavity further comprises aligning said cartridge with respect to said body using an alignment device in at least one of said window assemblies.

34. A sight window device as in claim 3, wherein said alignment means is interposed between said body and said window, said alignment means having a frame with first groove on one side of said frame, a second groove on the opposite side of said frame, and a sealing ring located within each respective groove for providing a vacuum-tight seal between said body and said window.

* * * * *